US012003857B2

(12) United States Patent
Kawakami (10) Patent No.: US 12,003,857 B2
(45) Date of Patent: Jun. 4, 2024

(54) IMAGE CAPTURING APPARATUS CAPABLE OF RECOGNIZING VOICE COMMAND, CONTROL METHOD, AND RECORDING MEDIUM

(71) Applicant: CANON KABUSHIKI KAISHA, Tokyo (JP)

(72) Inventor: Takashi Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 17/512,523

(22) Filed: Oct. 27, 2021

(65) Prior Publication Data

US 2022/0141389 A1 May 5, 2022

(30) Foreign Application Priority Data

Oct. 29, 2020 (JP) .................................. 2020-181149

(51) Int. Cl.
| | |
|---|---|
| *H04N 23/695* | (2023.01) |
| *G06V 20/00* | (2022.01) |
| *G06V 40/16* | (2022.01) |
| *G10L 15/22* | (2006.01) |
| *H04N 23/611* | (2023.01) |

(52) U.S. Cl.
CPC ........... *H04N 23/695* (2023.01); *G06V 20/00* (2022.01); *G06V 40/161* (2022.01); *G06V 40/174* (2022.01); *G10L 15/22* (2013.01); *H04N 23/611* (2023.01); *G10L 2015/223* (2013.01)

(58) Field of Classification Search
CPC .... G06V 20/00; G06V 40/161; G06V 40/172; G06V 40/174; G10L 15/22; G10L 2015/088; G10L 2015/223; H04N 23/611; H04N 23/695
See application file for complete search history.

(56) References Cited

U.S. PATENT DOCUMENTS

| 9,870,521 | B1 * | 1/2018 | Solh ........................... G06T 3/40 |
| 10,917,577 | B2 * | 2/2021 | Zhang ..................... G10L 15/02 |
| 11,627,247 | B2 * | 4/2023 | Kawakami ........... H04N 23/695 |
| | | | 348/222.1 |
| 11,659,268 | B2 * | 5/2023 | Mizobuchi ............. G06V 40/50 |
| | | | 348/207.99 |
| 11,769,491 | B1 * | 9/2023 | Bafna ..................... G10L 15/16 |
| | | | 704/231 |
| 2016/0182814 | A1 * | 6/2016 | Schwesinger ........ H04N 23/661 |
| | | | 348/14.03 |
| 2022/0094843 | A1 * | 3/2022 | Mizobuchi ........... H04N 23/611 |
| 2022/0132025 | A1 * | 4/2022 | Kawakami ............. H04N 23/64 |
| 2022/0337740 | A1 * | 10/2022 | Takagi ................... H04N 23/62 |

FOREIGN PATENT DOCUMENTS

| JP | 2019106694 A | 6/2019 |
| JP | 2019117375 A | 7/2019 |

* cited by examiner

*Primary Examiner* — Antoinette T Spinks
(74) *Attorney, Agent, or Firm* — Canon U.S.A., Inc. IP Division

(57) ABSTRACT

An image capturing apparatus includes an image capturing unit configured to capture an image of a subject, a driving unit configured to drive a driving member configured to change an imaging direction of the image capturing unit, and a detection unit configured to detect a first voice command for performing specific processing and a second voice command for starting the detection of the first voice command. The driving unit limits the driving of the driving member in response to the detection of the second voice command by the detection unit.

15 Claims, 7 Drawing Sheets

IMAGE CAPTURING APPARATUS CAPABLE OF RECOGNIZING VOICE COMMAND, CONTROL METHOD, AND RECORDING MEDIUM

BACKGROUND

Field of the Disclosure

The present disclosure relates to an image capturing apparatus capable of recognizing voice commands.

Description of the Related Art

Image capturing apparatuses capable of capturing images of their surroundings have been discussed in recent years. Such image capturing apparatuses are directed to capturing an image of a user's desired scene by automatically capturing an image of a subject in response to recognizing a voice command issued by the user.

Japanese Patent Application Laid-Open No. 2019-106694 discusses an image capturing apparatus having an automatic imaging mode that performs pan/tilt driving or zoom driving to automatically search for a subject and capture an image of the subject. In the automatic imaging mode, the image capturing apparatus enables manual capturing of an image based on a voice command.

In voice command-based processing, the apparatus configured to detect a voice command typically detects a voice command (a command word) for performing predetermined processing after detecting a voice command (a trigger word) for starting the detection of the command word, in order to prevent erroneous operations. However, Japanese Patent Application Laid-Open No. 2019-106694 does not take into account the use of the trigger word by the image capturing apparatus. In a case where the foregoing voice command-based processing is applied to the image capturing apparatus discussed in Japanese Patent Application Laid-Open No. 2019-106694, the image capturing apparatus discussed in Japanese Patent Application Laid-Open No. 2019-106694 is assumed to detect a trigger word and a command word while automatically searching for a subject in the automatic imaging mode. At the time when the trigger word is detected, the image capturing apparatus is continuing the automatic imaging since the subsequent voice command-based processing has not been identified yet. If the command word uttered by the user is a voice command that instructs the image capturing apparatus to capture an image of a subject, the subject that the user desires to image is expected to be the subject that the image capturing apparatus is imaging at the time when the user starts to utter the trigger word. However, if the automatic search is continued after the detection of the trigger word, the subject that the user desires to image may fall outside the angle of view by the time when the command word is detected, and capturing an image of the subject desired by the user may be missed.

SUMMARY

According to an aspect of the present disclosure, an image capturing apparatus includes an image capturing unit configured to capture an image of a subject, a driving unit configured to drive a driving member configured to change an imaging direction of the image capturing unit, and a detection unit configured to detect a first voice command for performing specific processing and a second voice command for starting the detection of the first voice command. The driving unit limits the driving of the driving member in response to the detection of the second voice command by the detection unit.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

The exemplary embodiments described below are examples of means for implementing the present disclosure, and may be corrected or modified as appropriate based on the configuration of an apparatus to which any of the exemplary embodiments is applied, and various conditions. The exemplary embodiments can also be combined as appropriate.

<Configuration of Image Capturing Apparatus>

Figure 1A:
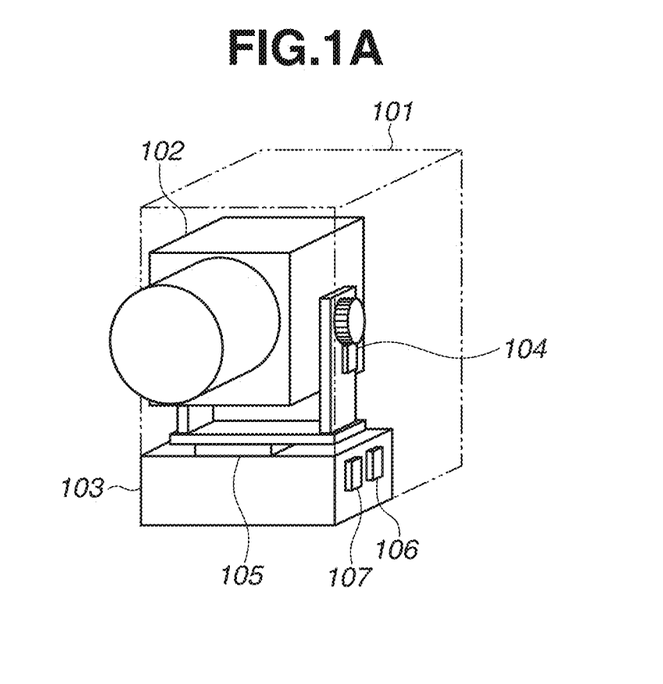
FIG. 1A is a diagram illustrating an example of an image capturing apparatus according to a first exemplary embodiment.

FIG. 1A illustrates a configuration of an image capturing apparatus 101 according to a first exemplary embodiment of the present disclosure.

The image capturing apparatus 101 illustrated in FIG. 1A is provided with operation members including a power switch that enables a user to perform an operation to switch between power on and off. The operation members also include a touch panel.

Figure 1B:
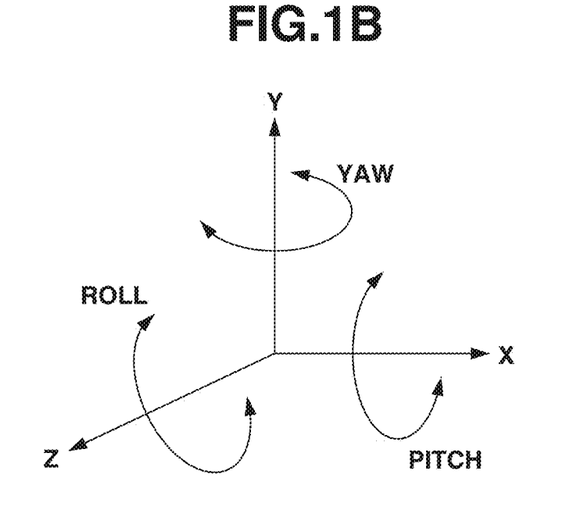
FIG. 1B is a diagram illustrating an operation of the image capturing apparatus according to the first exemplary embodiment.

A lens barrel 102 is a housing including optical lens groups and an image sensor. The lens barrel 102 is attached to the image capturing apparatus 101. A tilt rotation unit 104 and a pan rotation unit 105 are members for rotationally driving the lens barrel 102 with respect to a fixed portion 103. For example, the tilt rotation unit 104 is a motor that can rotate the lens barrel 102 in a pitch direction (tilt direction) illustrated in FIG. 1B. For example, the pan rotation unit 105 is a motor that can rotate the lens barrel 102 in a yaw direction (pan direction) illustrated in FIG. 1B. The lens barrel 102 can be driven to rotate in one or more axial directions by the tilt rotation unit 104 and the pan rotation unit 105. In the present exemplary embodiment, a Y-axis illustrated in FIG. 1B represents the rotation axis of the pan rotation unit 105. In the present exemplary embodiment, the positive direction of a Z-axis illustrated in FIG. 1B represents the front direction of the image capturing apparatus 101.

An angular velocity meter 106 and an acceleration meter 107 are, for example, a gyro sensor and an acceleration sensor, respectively, and disposed on the fixed portion 103 of the image capturing apparatus 101. The image capturing apparatus 101 detects vibrations of the image capturing apparatus 101 based on an angular velocity and acceleration measured by the angular velocity meter 106 and the acceleration meter 107, respectively. By rotationally driving the tilt rotation unit 104 and the pan rotation unit 105 based on the detected vibrations of the image capturing apparatus 101, the image capturing apparatus 101 can generate an image with shake and inclination of the lens barrel 102 corrected.

Figure 2:
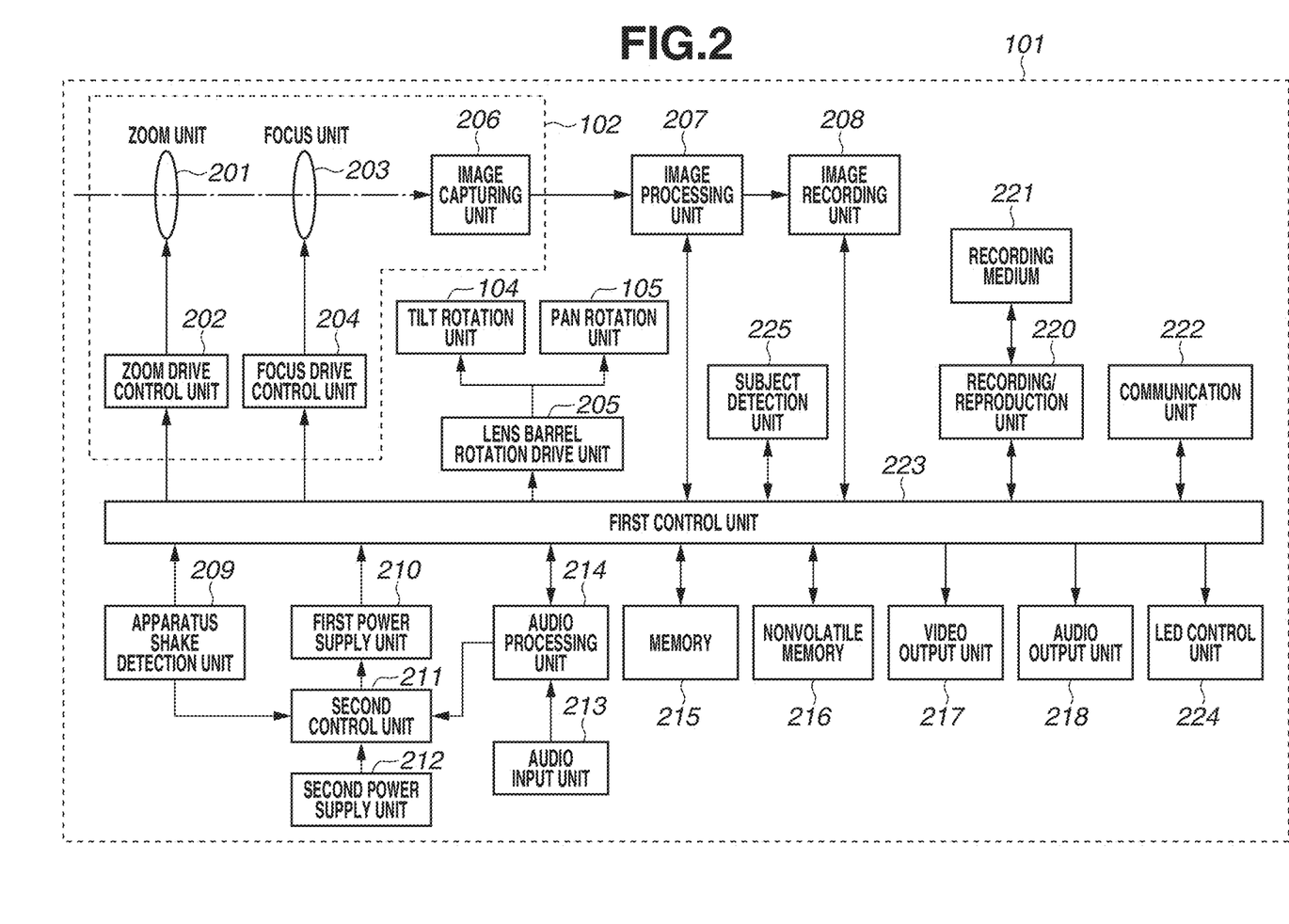
FIG. 2 is a diagram illustrating a configuration of the image capturing apparatus according to the first exemplary embodiment.

FIG. 2 is a block diagram illustrating a configuration of the image capturing apparatus 101 according to the present exemplary embodiment.

A first control unit 223 includes a processor (such as a central processing unit (CPU), a graphics processing unit (GPU), a microprocessor, or a micro processing unit (MPU)) and a memory (such as a dynamic random access memory (DRAM) or a static random access memory (SRAM)). The first control unit 223 performs various types of processing to control the blocks in the image capturing apparatus 101, and controls data transfer between the blocks. The first control unit 223 is an example of a control unit and a determination unit.

A nonvolatile memory 216 is capable of recording and erasing data. Operational constants and programs for the first control unit 223 are recorded in the nonvolatile memory 216.

A zoom unit 201 is an optical lens group forming a zoom lens for changing a zoom magnification. A zoom drive control unit 202 controls driving of the optical lenses in the zoom unit 201. A focus unit 203 is an optical lens group for focus adjustment.

A focus drive control unit 204 controls driving of the optical lenses in the focus unit 203. An image capturing unit 206 includes an image sensor that receives light incident through the optical lens groups. The image capturing unit 206 outputs, as analog image data, information about electric charges corresponding to the amount of the received light to an image processing unit 207. The zoom unit 201, the zoom drive control unit 202, the focus unit 203, the focus drive control unit 204, and the image capturing unit 206 are included in the lens barrel 102.

The image processing unit 207 performs image processing on the analog image data input from the image capturing unit 206, and outputs digital image data. Examples of the image processing include distortion correction, white balance adjustment, and color interpolation processing. An image recording unit 208 converts the digital image data output from the image processing unit 207 into an image file format such as a Joint Photographic Experts Group (JPEG) format, or a moving image file format such as a Moving Picture Experts Group (MPEG) format. The digital image data subjected to the conversion is transmitted to a memory 215 and a video output unit 217 to be described below. If the digital image data stored in the memory 215 is to be recorded, the first control unit 223 outputs the digital image data to a recording/reproduction unit 220.

A lens barrel rotation drive unit 205 drives the tilt rotation unit 104 and the pan rotation unit 105 to drive the lens barrel 102 in the tilt direction and the pan direction. The lens barrel rotation drive unit 205 changes (drives) an imaging direction by driving the lens barrel 102 in the tilt direction and the pan direction. The lens barrel rotation drive unit 205 is an example of a driving unit.

An apparatus shake detection unit 209 includes, for example, the angular velocity meter 106 that detects the angular velocity of the image capturing apparatus 101 in three axial directions and the acceleration meter 107 that detects the acceleration of the image capturing apparatus 101 in the three axial directions. The apparatus shake detection unit 209 calculates the rotation angle of the image capturing apparatus 101 and the shift amount of the image capturing apparatus 101 based on signals detected by the angular velocity meter 106 and the acceleration meter 107.

An audio input unit 213 includes a plurality of microphones. The audio input unit 213 performs analog-to-digital (A/D) conversion on audio signals input from the microphones, and outputs the resulting audio signals to an audio processing unit 214.

The audio processing unit 214 can detect the direction of sound on a plane where the plurality of microphones are installed. The direction of sound detected by the audio processing unit 214 can be used for a search and automatic imaging to be described below. Moreover, the audio processing unit 214 can recognize specific voice commands. In the present exemplary embodiment, there are two types of specific voice commands, namely, a trigger word and a command word. The trigger word is a command that serves as a trigger for starting recognition of the command word. For example, the trigger word is a command including specific keywords uttered by the user, such as "OK" and "camera". The command word is a command for instructing the image capturing apparatus 101 to perform predetermined processing. Examples of the predetermined processing include still image capturing processing, moving image capturing start processing, moving image capturing end processing, sleep processing, subject change processing, and automatic imaging processing. The command word is a command including keywords that differ depending on the predetermined processing. Examples of the keywords include "capture a still image" for the still image capturing processing and "capture a moving image" for the moving image capturing start processing. These voice commands are recorded in the memory 215 of the image capturing apparatus 101 in advance. The image capturing apparatus 101 may be configured to register voice commands for performing user's desired processing in addition to the voice commands recorded in advance.

The audio processing unit 214 also performs audio-related processing such as optimization processing and encoding on the input audio signals. The first control unit 223 transmits the audio signals processed by the audio processing unit 214, to the memory 215. The memory 215 temporarily stores the data input from the image recording unit 208 and the audio signals input from the audio processing unit 214. If the audio signals are to be recorded, the first control unit 223 outputs the audio signals from the memory 215 to the recording/reproduction unit 220.

The recording/reproduction unit 220 records the image data, the audio signals, and other data such as imaging-related control data on a recording medium 221. The recording medium 221 may be built in the image capturing apparatus 101 or may be removable. The recording medium 221 can record various types of data such as image data and audio signals. In the present exemplary embodiment, the recording medium 221 has a capacity greater than that of the nonvolatile memory 216. Examples of the recording medium 221 include a hard disk, an optical disc, a magnetooptical disc, a compact disc read-only memory (CD-ROM), a digital versatile disc recordable (DVD-R), a magnetic tape, a nonvolatile semiconductor memory, and a flash memory.

The recording/reproduction unit 220 can read (reproduce) the image data, audio signals, various kinds of data, and programs that are recorded on the recording medium 221. The image data and audio signals recorded on the recording medium 221 are reproduced in the following manner. The first control unit 223 outputs the image data and audio signals read by the recording/reproduction unit 220 to the image processing unit 207 and the audio processing unit 214, respectively. The image processing unit 207 and the audio processing unit 214 then decode the image data and the audio signals, respectively. The image processing unit 207 and the audio processing unit 214 output the decoded signals to the video output unit 217 and an audio output unit 218, respectively.

A second control unit 211 controls power supply to the first control unit 223. For example, the second control unit 211 includes a processor (such as a CPU, a microprocessor, or an MPU) and a memory (such as a DRAM or an SRAM). In the present exemplary embodiment, the second control unit 211 is provided separately from the first control unit 223 that controls the entire main system of the image capturing apparatus 101.

A first power supply unit 210 and a second power supply unit 212 supply power for operating the first control unit 223 and the second control unit 211, respectively. In the present exemplary embodiment, the first power supply unit 210 supplies power larger than that supplied by the second power supply unit 212. In the present exemplary embodiment, the first power supply unit 210 and the second power supply unit 212 are selected based on the amounts of power to supply. For example, the first power supply unit 210 is a switch for supplying power to the first control unit 223. The second power supply unit 212 is a lithium battery or an alkali battery. When the power switch on the image capturing apparatus 101 is pressed, power is supplied to the second control unit 211 first and then to the first control unit 223.

The image capturing apparatus 101 has a sleep state. In the sleep state, the first control unit 223 controls the first power supply unit 210 to turn off the power supply to the first control unit 223. In the sleep state, the first control unit 223 is not powered, but the second control unit 211 still operates and obtains information from the apparatus shake detection unit 209 and the audio processing unit 214. The second control unit 211 performs processing for determining whether to activate the first control unit 223 based on such input information.

If the second control unit 211 determines to activate the first control unit 223 (cancel the sleep state), the second control unit 211 controls the first power supply unit 210 to supply power to the first control unit 223.

The audio output unit 218 outputs an audio signal, such as an electronic shutter sound, from a speaker built in the image capturing apparatus 101, for example, during imaging. A light-emitting diode (LED) control unit 224 controls an LED provided on the image capturing apparatus 101 to turn on or blink in a preset pattern, for example, during imaging.

The video output unit 217 includes a video output terminal, for example, and outputs an image signal for displaying a video image on an external display connected to the image capturing apparatus 101. The audio output unit 218 and the video output unit 217 may be configured as an interface with one integrated terminal, such as a High-Definition Multimedia Interface (registered trademark) (HDMI (registered trademark)) terminal.

A communication unit 222 is an interface for performing communication between the image capturing apparatus 101 and an external apparatus. For example, the communication unit 222 transmits and receives data such as an audio signal and image data to and from the external apparatus. If the communication unit 222 receives a control signal related to imaging such as start of imaging, end of imaging, pan driving, tilt driving, and zoom driving, the first control unit 223 drives the image capturing apparatus 101 based on the control signal. The communication unit 222 includes a wireless communication module such as an infrared communication module, a Bluetooth® communication module, a wireless local area network (LAN) communication module, a Wireless Universal Serial Bus (USB) module, and a Global Positioning System (GPS) receiver.

A subject detection unit 225 reads, from the memory 215, the image data output from the image processing unit 207, and performs subject recognition including human recognition and object recognition. For example, in the case of human recognition, the subject detection unit 225 detects a subject's face. Patterns for determining a subject's face are registered in the image capturing apparatus 101 in advance. Identifiers for identifying different subjects are given to the patterns. In processing for detecting a subject's face, the subject detection unit 225 detects an area that matches a pattern for determining a subject's face in the captured image, thereby detecting a subject's face. The subject detection unit 225 can also distinguish a plurality of persons registered in the image capturing apparatus 101 from each other.

At the same time, the subject detection unit 225 calculates the degree of reliability that indicates the certainty of the detected subject's face. For example, the degree of reliability is calculated from the size of the face area in the image and the degree of matching with the face pattern. In addition, the subject detection unit 225 can detect face information, such as whether the detected face is smiling, whether the eyes of the face are open, and the direction of the face, by performing pattern matching on the subject's face in the image. The method for detecting the face information is not limited to pattern matching, and a known technique such as a deep learning-based method can be used.

In object recognition processing, the subject detection unit 225 can recognize an object by determining whether the object matches a pattern registered in advance. Alternatively, the subject detection unit 225 can recognize an object by extracting a feature amount of the subject by using hue, saturation, and other histograms of the captured image.

With the above-described method, the first control unit 223 can detect a subject from the captured image data by using the subject detection unit 225.

<System Configuration Including External Apparatus>

Figure 3:
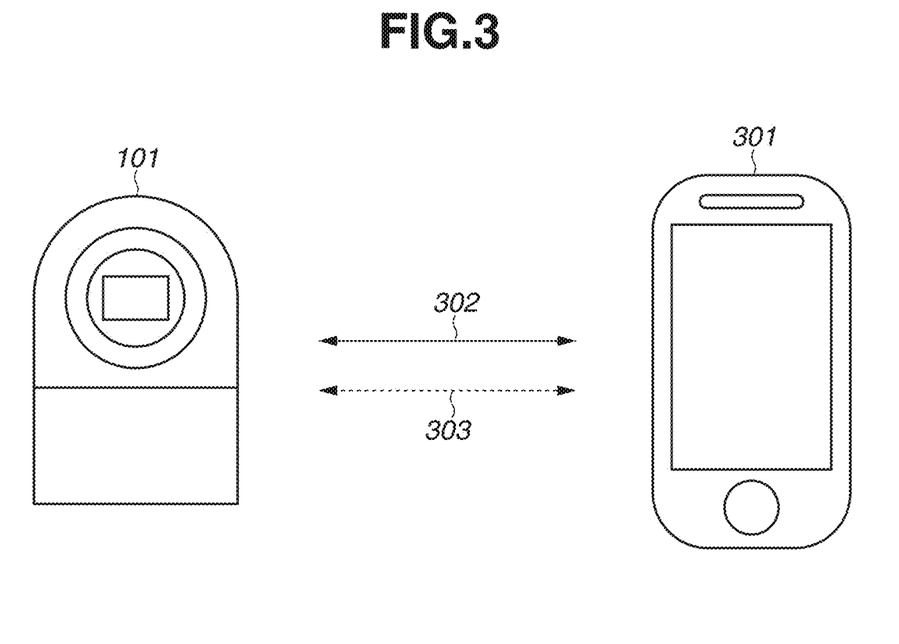
FIG. 3 is a diagram illustrating a system configuration including the image capturing apparatus and an external apparatus according to the first exemplary embodiment.

FIG. 3 illustrates a configuration example of a wireless communication system including the image capturing apparatus 101 and a smart device 301. The image capturing apparatus 101 is a digital camera, for example. The smart device 301 is a smartphone including a Bluetooth® communication module and a wireless LAN communication module, for example.

In the present exemplary embodiment, the image capturing apparatus 101 and the smart device 301 can communicate with each other via two communication paths. One is a communication path 302 based on a wireless LAN compliant with the Institute of Electrical and Electronics Engineers (IEEE) 802.11 standard series, for example. The other is a communication path 303 having a master-slave relationship between a control station and a slave station, such as Bluetooth® Low Energy. The wireless LAN and Bluetooth® Low Energy are examples of the communication methods. Other communication methods may be used as long as each of the communication apparatuses has two or more communication functions and one of the communication functions that performs communication in a relationship between a control station and a slave station can control the other communication function, for example. However, it is assumed here that a first communication such as wireless LAN communication enables faster communication than a second communication such as Bluetooth® Low Energy communication, and the second communication has at least one of lower power consumption and a shorter communication range than that of the first communication, without loss of generality.

<Configuration of External Apparatus>

Figure 4:
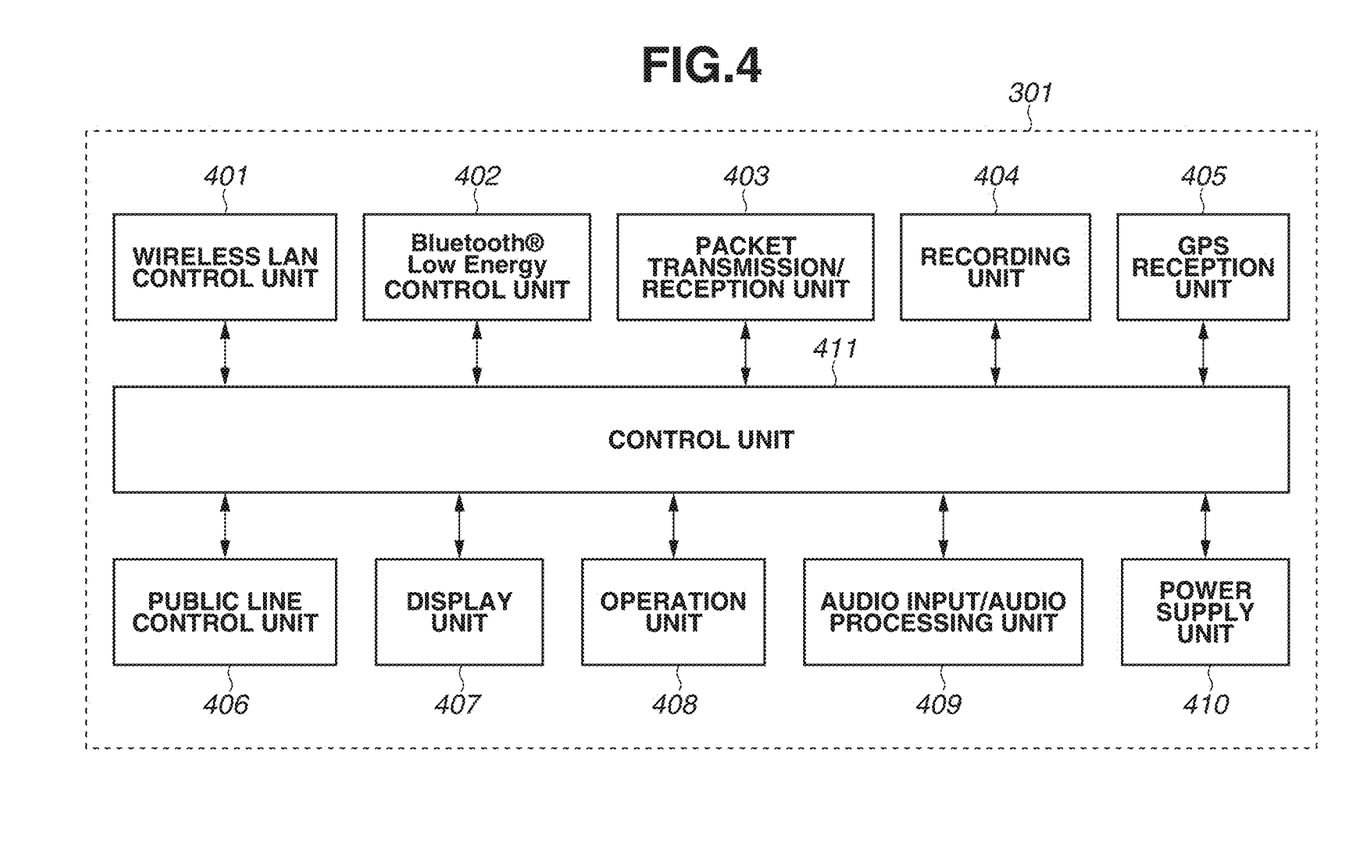
FIG. 4 is a diagram illustrating a configuration of the external apparatus according to the first exemplary embodiment.

A configuration of the smart device 301 that is an example of the external apparatus will be described with reference to FIG. 4. The smart device 301 is a smartphone or a mobile phone. In other words, the smart device 301 is a portable terminal.

The smart device 301 includes, for example, a wireless LAN control unit 401 for performing wireless LAN communication, a Bluetooth® Low Energy control unit 402 for performing Bluetooth® Low Energy communication, and a public line control unit 406 for performing public wireless communication. The smart device 301 also includes a packet transmission/reception unit 403.

The wireless LAN control unit 401 performs wireless LAN radio frequency (RF) control, communication processing, and various kinds of control on communication using a wireless LAN compliant with the IEEE 802.11 standard series. The wireless LAN control unit 401 also performs protocol processing related to the wireless LAN communication. The Bluetooth® Low Energy control unit 402 performs Bluetooth® Low Energy RF control, communication processing, and various kinds of control on Bluetooth® Low Energy communication. The Bluetooth® Low Energy control unit 402 also performs protocol processing related to the Bluetooth® Low Energy communication. The public line control unit 406 performs public wireless communication RF control, communication processing, and various kinds of control on public wireless communication. The public line control unit 406 also performs protocol processing related to the public wireless communication. The public wireless communication is compliant with, for example, the International Multimedia Telecommunications (IMT) standard or the Long Term Evolution (LTE) standard. The packet transmission/reception unit 403 performs processing for at least one of transmission and reception of packets related to the wireless LAN communication, the Bluetooth® Low Energy communication, and the public wireless communication. While in the present exemplary embodiment, the smart device 301 is described to perform at least one of packet transmission and packet reception during communication, any other communication method such as circuit switching may be used instead of the packet exchange.

The smart device 301 according to the present exemplary embodiment further includes a control unit 411, a recording unit 404, a GPS reception unit 405, a display unit 407, an operation unit 408, an audio input/audio processing unit 409, and a power supply unit 410. The control unit 411 controls the entire smart device 301, for example, by executing a program recorded in the recording unit 404. The recording unit 404 records, for example, the program to be executed by the control unit 411 and various types of information including parameters for use in communication. Various operations of the smart device 301 to be described below are implemented by the control unit 411 executing the program recorded in the recording unit 404.

The power supply unit 410 supplies power to the units of the smart device 301. For example, the display unit 407 has a function capable of outputting visually recognizable information, such as a liquid crystal display (LCD) or an LED, and a function capable of outputting sounds, such as a speaker, and displays and outputs various kinds of information. For example, the operation unit 408 includes a button for receiving a user's operation on the smart device 301. The display unit 407 and the operation unit 408 may be formed of a common member such as a touch panel.

The audio input/audio processing unit 409 includes a microphone, for example, and performs voice recognition processing on an audio signal input from the microphone. The audio input/audio processing unit 409 can recognize a user's operation on the information processing apparatus 101 by voice recognition. In the voice recognition processing, the audio input/audio processing unit 409 recognizes a voice command issued by the user, from the audio signal input from the microphone, using a dedicated application. For example, the smart device 301 can register, in the image capturing apparatus 101, a voice command for causing the audio processing unit 214 of the image capturing apparatus 101 to perform specific processing, via the communication path 302.

The GPS reception unit 405 analyzes GPS signals received from the satellites to estimate the current position (longitude and latitude information) of the smart device 301. If the estimated current position falls within a preset range (a predetermined radius range) such as a user's house, the smart device 301 notifies the image capturing apparatus 101 of information about the current position via the Bluetooth® Low Energy control unit 402. The image capturing apparatus 101 can use the current position as a parameter for automatic imaging (described below) and automatic editing.

If the current position changes and moves out of the preset range, the smart device 301 notifies the image capturing apparatus 101 of information about the movement via the Bluetooth® Low Energy control unit 402. The image capturing apparatus 101 uses the information as a parameter for automatic imaging and automatic editing. The smart device 301 may estimate the current position of the smart device 301 based on information about wireless networks nearby, using Wi-Fi positioning system (WPS).

As described above, the smart device 301 exchanges data with the image capturing apparatus 101 through communication using the wireless LAN control unit 401 and the Bluetooth® Low Energy control unit 402. For example, the image capturing apparatus 101 and the smart device 301 transmit and receive audio signals and data such as image data to and from each other. The smart device 301 can also transmit setting information about the imaging by the image capturing apparatus 101 to the image capturing apparatus 101. The smart device 301 can also transmit control signals related to the imaging processing by the image capturing apparatus 101 and position information to the image capturing apparatus 101.

<Automatic Imaging Processing>

In automatic imaging processing, the first control unit 223 determines an imaging timing and automatically captures an image of a subject. In the automatic imaging processing, the first control unit 223 repeats the cycle of automatically determining a subject as an imaging target and capturing an image of the subject if the first control unit 223 determines that imaging of a good image or moving image is possible or if a certain period of time has elapsed. This enables the image capturing apparatus 101 to record good scenes that appear unexpectedly in everyday life or subtle changes in everyday life without the user manually capturing images.

Figure 5:
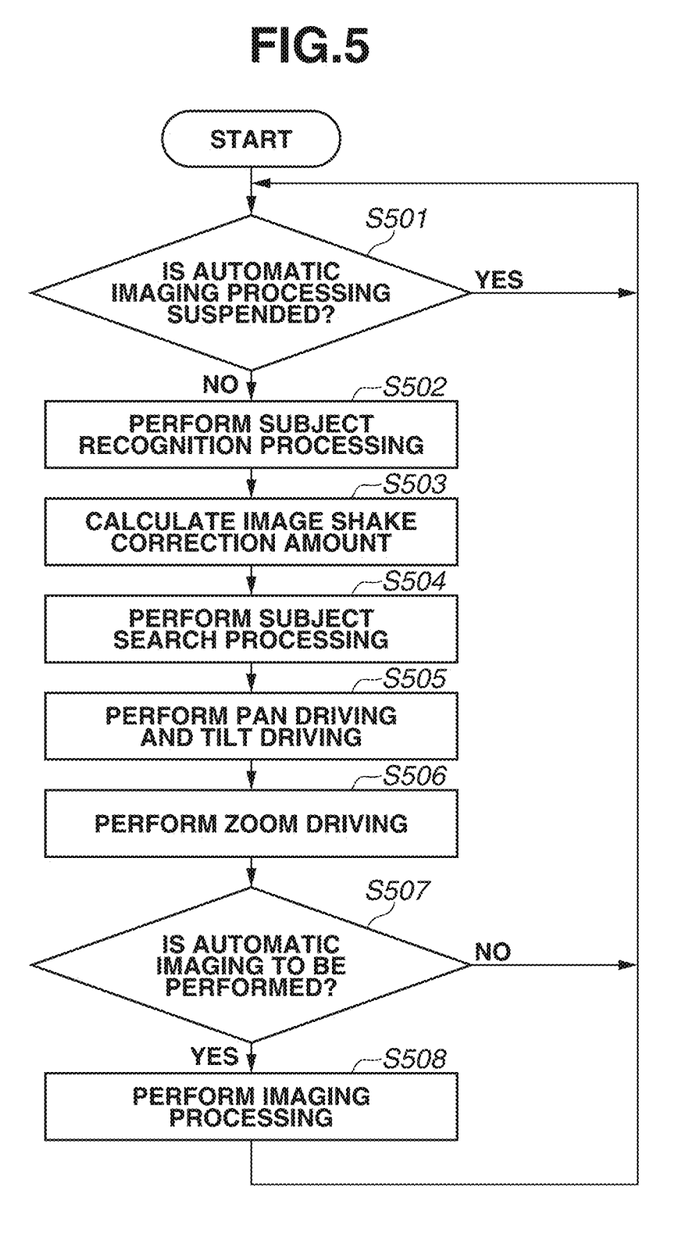
FIG. 5 is a flowchart illustrating automatic imaging processing according to the first exemplary embodiment.

FIG. 5 is a flowchart illustrating the automatic imaging processing performed by the image capturing apparatus 101 according to the present exemplary embodiment.

The processing of this flowchart is started when the user turns on the power switch of the image capturing apparatus 101. In the present exemplary embodiment, a wireless connection is established between the image capturing apparatus 101 and the smart device 301. The user can use a dedicated application on the smart device 301 to perform various operations of the image capturing apparatus 101. The processing of the steps in the flowchart is implemented by the first control unit 223 controlling the units of the image capturing apparatus 101.

In step S501, the first control unit 223 determines whether the automatic imaging processing is suspended. The suspension of the automatic imaging processing will be described below in the description of the voice recognition processing. If the automatic imaging processing is suspended (YES in step S501), the first control unit 223 waits until the suspension of the automatic imaging processing is cancelled. In other words, if the automatic imaging processing is suspended, the processing of step S501 is repeated until the suspension of the automatic imaging processing is cancelled. If the automatic imaging processing is not suspended (NO in step S501), the processing proceeds to step S502.

In step S502, the first control unit 223 causes the image processing unit 207 to perform image processing on the signal captured by the image capturing unit 206 and generate an image for subject recognition. The first control unit 223 further controls the subject detection unit 225 to perform subject recognition, including human recognition and animal recognition, on the generated image for subject recognition. For example, the first control unit 223 retains in advance the patterns for determining a subject. In the subject recognition, the first control unit 223 causes the subject detection unit 225 to determine a subject based on the degrees of matching between the retained patterns and a pattern included in the image for subject recognition. At this time, the subject detection unit 225 performs personal identification of a subject.

In addition to the determination of a subject, the first control unit 223 detects the position of the subject within the angle of view.

In step S503, the first control unit 223 calculates an image shake correction amount. More specifically, the first control unit 223 first calculates an absolute angle of the image capturing apparatus 101 based on information about the angular velocity and acceleration obtained by the apparatus shake detection unit 209. The first control unit 223 then determines stabilization angles for moving the tilt rotation unit 104 and the pan rotation unit 105 in angular directions to cancel out the absolute angle, as the image shake correction amount.

In step S504, the first control unit 223 performs subject search processing. The subject search processing includes the following processes:

(1) Area Division

Figure 6A:
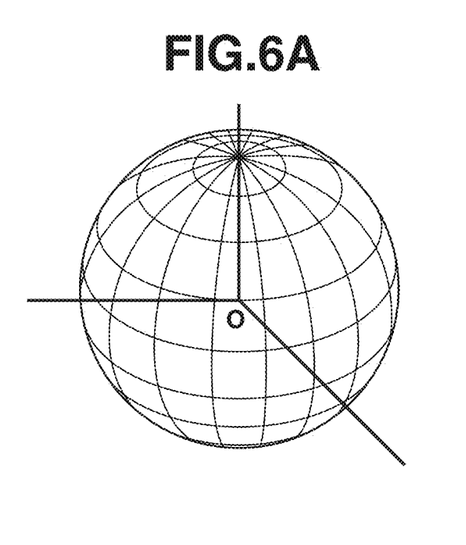
FIGS. 6A to 6D are diagrams illustrating area division in a captured image according to the first exemplary embodiment.
Figure 6B:
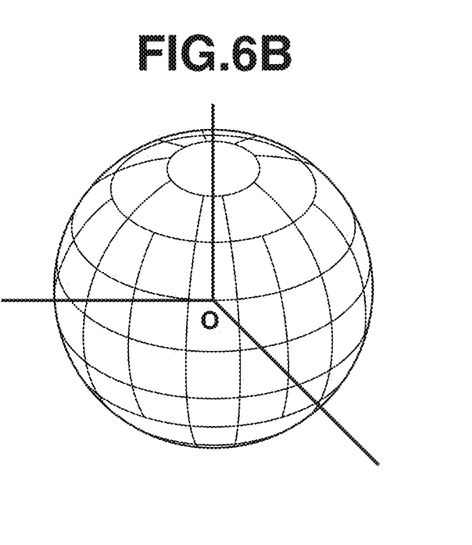
Figure 6C:
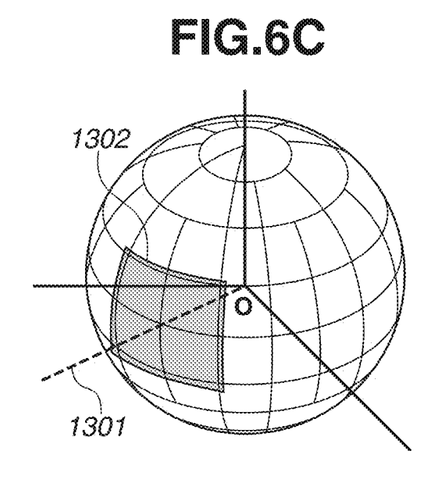

Area division will be described with reference to FIGS. 6A to 6D. In FIGS. 6A to 6C, a spherical area is divided with the position of the image capturing apparatus 101 as an origin point O. In the example of FIG. 6A, the spherical area is divided in units of 22.5° in the tilt direction and the pan direction.

According to the division illustrated in FIG. 6A, as the angle in the tilt direction gets farther from 0°, the horizontal circumference decreases and each area becomes smaller. On the other hand, as illustrated in FIG. 6B, the image capturing apparatus 101 according to the present exemplary embodiment sets the horizontal range of each area having a tilt angle of 450 or more to be greater than 22.5°.

Figure 6D:
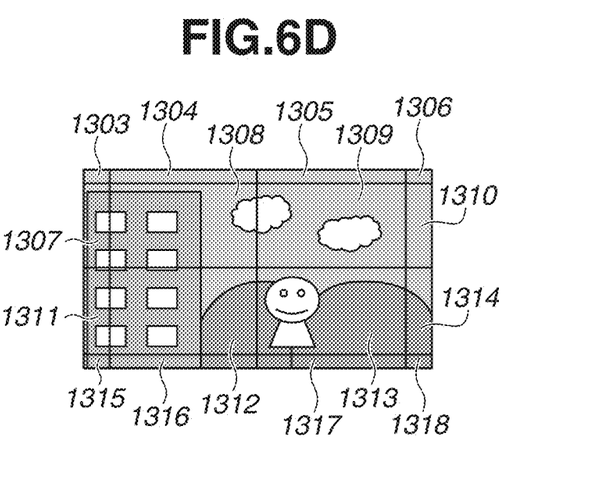

Next, areas within the angle of view of the image captured by the image capturing apparatus 101 will be described with reference to FIGS. 6C and 6D. An axis 1301 represents a reference direction for the imaging direction of the image capturing apparatus 101. The area division is performed with reference to this direction. For example, the axis 1301 represents the imaging direction of the image capturing apparatus 101 during power-on or a direction determined in advance as the reference direction for the imaging direction. An area 1302 represents an angle of view area of the image captured by the image capturing unit 206. FIG. 6D illustrates an example of a through image captured by the image capturing unit 206 in the area 1302. In FIG. 6D, the image area within the angle of view of the through image is divided into areas 1303 to 1318 based on the area division illustrated in FIG. 6C.

(2) Calculation of Importance Level for Each Area

The first control unit 223 calculates importance levels of the respective areas obtained by the above-described division, based on the subjects in the areas and the scene situations of the areas. The importance levels indicate the order of priority in performing a subject search. The importance levels based on the situations of the subjects are calculated, for example, based on the number of subjects in an area, the size of a subject's face, the direction of the subject's face, the certainty of detection of the subject's face, the subject's facial expression, and a personal identification result of the subject. The importance levels based on the scene situations are calculated, for example, based on general object recognition results, scene determination results (such as a blue sky, backlight, and an evening view), the levels and voice recognition results of sounds coming from the areas, and motion detection information within the areas. At this time, the first control unit 223 drives the image capturing apparatus 101 to search the entire surroundings.

For example, if a subject's face is registered in the image capturing apparatus 101, the first control unit 223 increases the importance level of the area where the subject's face registered in the image capturing apparatus 101 is detected. For example, the subject's face is recorded in the nonvolatile memory 216 as a pattern for determining the subject. If the importance level of the area where the subject's face is detected is increased, the first control unit 223 returns the importance level of the area to the original level when a predetermined time has elapsed or when imaging has been performed a predetermined number of times.

(3) Determination of Search Area

After determining the importance levels of the respective areas as described above, the first control unit 223 determines to intensively search an area having a high importance level. The first control unit 223 then calculates a pan angle and a tilt angle for capturing an image of the area having a high importance level.

In step S505, the first control unit 223 performs pan driving and tilt driving. More specifically, the first control unit 223 calculates a pan driving amount and a tilt driving amount based on the image shake correction amount and the pan and tilt angles calculated in step S504. The first control unit 223 then controls the driving of the tilt rotation unit 104 and the pan rotation unit 105 via the lens barrel rotation drive unit 205 based on the calculated pan driving amount and tilt driving amount, respectively. In the present exemplary embodiment, it is assumed that the first control unit 223 detects a subject in an area having a high importance level and starts to capture an image of the subject, by performing the pan driving and the tilt driving in step S505. The first control unit 223 then controls the lens barrel rotation drive unit 205 to track the subject (to keep the subject within the angle of view).

In step S506, the first control unit 223 controls the zoom unit 201 to perform zoom driving. For example, the first control unit 223 drives the zoom unit 201 based on the state of the subject of which imaging has been started in step S505. For example, if the subject's face in the angle of view is very small, the first control unit 223 controls the zoom unit 201 to zoom to the telephoto side so that an image of the subject's face is captured at an appropriate (larger) size within the angle of view. On the other hand, if the subject's face in the angle of view is very large, the first control unit 223 controls the zoom unit 201 to zoom to the wide-angle side so that an image of the subject's face is captured at an appropriate (smaller) size within the angle of view. Such zoom control can maintain the state suitable for tracking the subject.

In steps S504 to S506, a method for performing a subject search by pan driving, tilt driving, and zoom driving has been described. Alternatively, a subject search may be performed by an image capturing system that captures an image in all directions at a time using a plurality of wide-angle lenses. In this case, the overall processing load for image processing, such as subject detection, using all the signals obtained by the omnidirectional imaging as an input image is high. Thus in this case, the first control unit 223 is configured to cut out a part of the image obtained by the omnidirectional imaging and perform subject search processing within the cut-out image area.

With this configuration, the first control unit 223 calculates the importance levels of the respective areas in a manner similar to the foregoing method, changes the cut-out position based on the importance levels, and makes an automatic imaging determination to be described below. This enables a subject search at a high speed while suppressing the power consumption for the image processing.

In step S507, the first control unit 223 determines whether to perform automatic imaging.

The determination of whether to perform automatic imaging will be described now. The determination of whether to perform automatic imaging is made based on whether an imaging score exceeds a predetermined value. The imaging score is a parameter used to determine whether to perform automatic imaging. The imaging score is incremented based on a subject detection state and a lapse of time. Suppose, for example, the first control unit 223 is designed to perform automatic imaging if the imaging score exceeds 2000 points. In this case, the imaging score has an initial value of 0 points, and is incremented based on the lapse of time since the entry of an automatic imaging mode. For example, the imaging score is incremented at such a rate as to reach 2000 points in 120 seconds. If 120 seconds have elapsed with no subject detected, the imaging score reaches 2000 points based on the increment with the lapse of time, and automatic imaging is performed. If a high priority subject is detected during the lapse of time, 1000 points are added to the imaging score. For example, the high priority subject is a subject set by the user as a high priority imaging target, among the subjects whose faces are registered in the image capturing apparatus 101. With a high priority subject detected, the imaging score can reach 2000 points more easily and as a result, the imaging frequency is likely to increase.

In addition, for example, if the subject's smiling face is recognized, 800 points are added to the imaging score. The points based on the smiling face are added for not only the high priority subject but also the other subjects. In the present exemplary embodiment, an example where the points to be added based on the smiling face are the same regardless of whether the subject is of high priority will be described. However, this is not restrictive. For example, more points may be added in response to the detection of the smiling face of a high priority subject than in response to the detection of the smiling face of a low priority subject. This enables imaging closer to the user's intention. If the imaging score exceeds 2000 points because of the addition of points based on such emotional change in the subject's facial expression, automatic imaging is performed. Even if the imaging score does not exceed 2000 points with the addition of points based on the facial expression change, the imaging score reaches 2000 points faster with the addition of points based on the lapse of time.

A case where the increment with the lapse of time is linear with respect to time will be described as an example. For example, in the case of adding 2000 points in 120 seconds, 2000/120 points are added per second. However, this is not restrictive. For example, the imaging score may be incremented in such a manner that no point is added until 110 seconds out of 120 seconds, and 200 points are added per second so as to reach 2000 points in 10 seconds from 110 seconds to 120 seconds. This can prevent the imaging score from reaching the value that enables imaging regardless of the priority level, due to the addition of points based on the subject's facial expression change. With the method of linearly incrementing the imaging score with the lapse of time, the priority level is less likely to be reflected. The reason is that in a case where the imaging score has already been incremented with the lapse of a long time, the imaging score can often reach the value that enables imaging, due to the addition of points based on the change of a low priority subject into a smiling face. On the other hand, reducing the points to be added based on the facial expression change is not desirable because if the points are reduced, the timing of the facial expression change can be missed. In view of this, the first control unit 223 is configured to not increment the imaging score until 110 seconds. In the presence of a low priority subject, 110 seconds elapse without points being added. By contrast, in the presence of a high priority subject, 1000 points are added at the time of detecting the high priority subject, and thus 1000 points have already been added before 110 seconds even though points based on the lapse of time are not added until 110 seconds.

Accordingly, in a case where points are added based on the subject's facial expression change, the possibility of the imaging score reaching the value that enables imaging in the presence of a low priority subject can be made lower than in the presence of a high priority subject. As a result, the priority level is more likely to be reflected. While in the foregoing description, the subject's facial expression change has been described as an example, other criteria for adding points may be used. Examples of the criteria include whether a voice becomes louder and whether gestures become larger.

Also with such criteria, the point addition method is changed as described above so that the priority level is more likely to be reflected.

Even if the imaging score does not exceed 2000 points based on the subject's behavior, an image is always captured in 120 seconds based on the lapse of time. This prevents no image from being captured over a period of time.

If a subject is detected in the middle of the 120-seconds period, the time to start the increment may be advanced. More specifically, for example, if a high priority subject is detected upon a lapse of 60 seconds, 1000 points are added, but the imaging score does not exceed 2000 points. Then, the linear increment may be started after a lapse of 30 seconds from the detection of the subject, instead of not being started until 110 seconds. Alternatively, the linear increment may be started 20 seconds before 120 seconds, not 10 seconds before 120 seconds. This increases the possibility of an image of a high priority subject being captured, thereby making it easier to implement imaging closer to the user's intention.

After the automatic imaging is performed, the imaging score is reset to 0 points. No automatic imaging is performed until the imaging score exceeds 2000 points again.

The above is the description of the determination of whether to perform automatic imaging. If the first control unit 223 makes the foregoing determination and determines to perform automatic imaging (YES in step S507), the processing proceeds to step S508. If the first control unit 223 determines to not perform automatic imaging (NO in step S507), the processing proceeds to step S501.

In step S508, the first control unit 223 performs imaging processing. Examples of the imaging processing include still image capturing processing and moving image capturing processing.

The above is the description of the automatic imaging processing performed by the image capturing apparatus 101 according to the present exemplary embodiment. By performing the above-described processing for automatically capturing an image of a subject, the image capturing apparatus 101 can capture user's desired images or moving images without imaging instructions from the user.

The first control unit 223 may perform the automatic imaging processing by repeating the execution of the subject search processing and the imaging processing for a predetermined time and the execution of sleep processing for entering the sleep state for a predetermined time. In the sleep processing, the first control unit 223 controls the first power supply unit 210 to turn off the power supply to the first control unit 223 while the second control unit 211 is running.

This enables the first control unit 223 to automatically capture images or moving images of user's desired scenes while suppressing power consumption. For the sake of distinction from the foregoing continuous imaging processing, such automatic imaging processing will be also referred to as intermittent imaging processing.

<Voice Recognition Processing>

Figure 7:
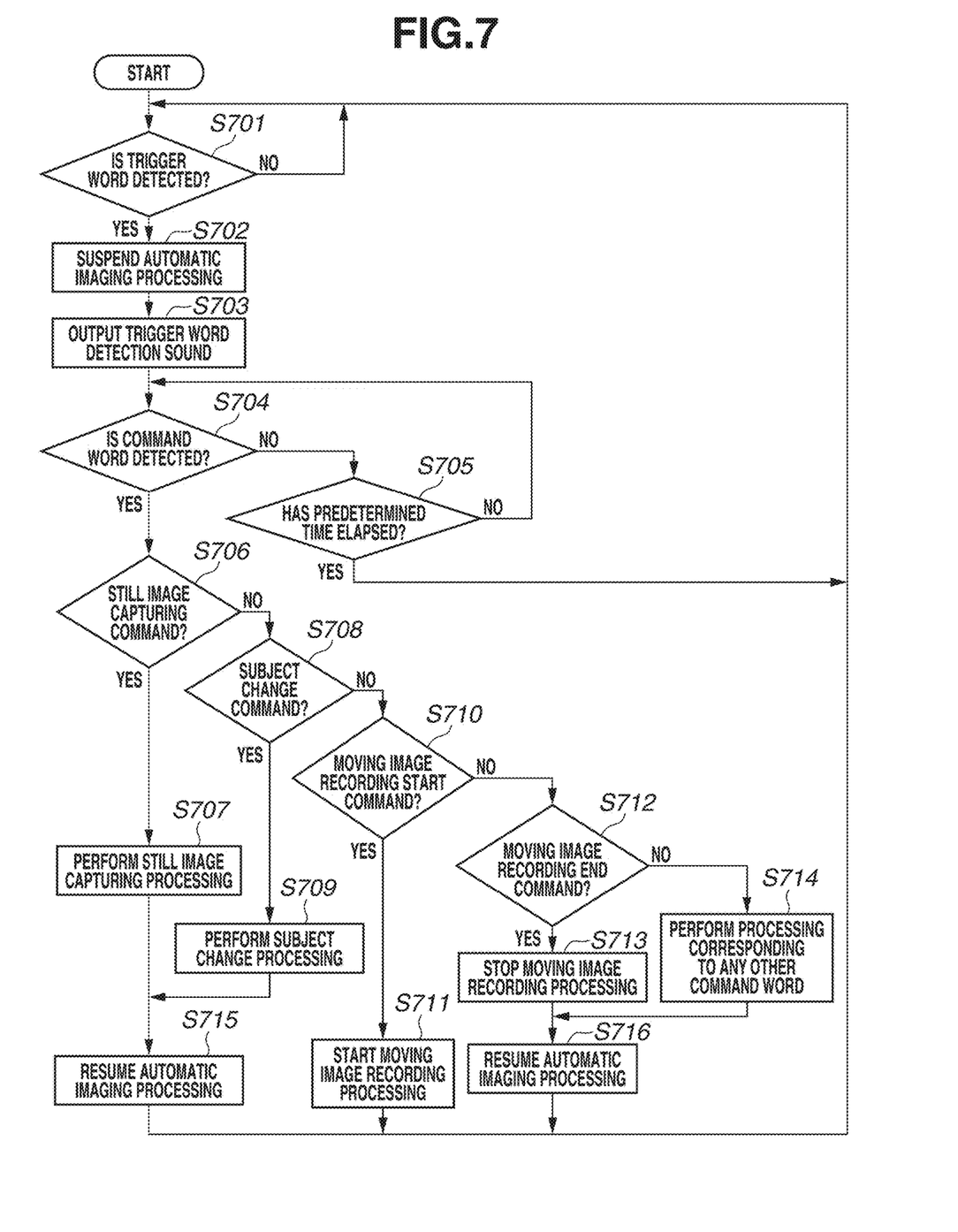
FIG. 7 is a flowchart illustrating voice recognition processing according to the first exemplary embodiment.

FIG. 7 is a flowchart of the voice recognition processing performed by the image capturing apparatus 101 according to the present exemplary embodiment.

The processing of this flowchart is started when the input of the audio signals from the microphones is detected by the audio input/audio processing unit 409. The processing of this flowchart is performed concurrently with the automatic imaging processing of FIG. 5. In the present exemplary embodiment, a case where the flowchart is started when the input of the audio signals from the microphones is detected by the audio input/audio processing unit 409 during the automatic imaging processing of FIG. 5 will be described as an example. This processing is implemented by the first control unit 223 executing a program recorded in the nonvolatile memory 216.

In step S701, the first control unit 223 determines whether a trigger word is detected. The trigger word is a start command to start the recognition of a voice command for giving a specific instruction to the image capturing apparatus 101 by voice. In a case where the user gives an instruction to the image capturing apparatus 101 by voice, the user utters a command word after the trigger word and makes the image capturing apparatus 101 recognize the command word. If the trigger word is detected (YES in step S701), the processing proceeds to step S702. If the trigger word is not detected (NO in step S701), the processing returns to step S701. The processing of step S701 is repeated until the trigger word is detected.

In step S702, the first control unit 223 suspends the automatic imaging processing. In the present exemplary embodiment, the first control unit 223 shifts to a command word waiting state if the trigger word is detected. More specifically, the first control unit 223 suspends the subject search processing (in step S504), the driving processing (in steps S505 and S506), and the imaging processing (in step S508) in the automatic imaging processing described with reference to the flowchart of FIG. 5. Examples of the driving processing include pan driving, tilt driving, and zoom driving. Examples of the imaging processing include still image capturing and moving image capturing. Meanwhile, in step S702, the first control unit 223 does not suspend and continues the image recognition processing for subject detection (in step S502). The reason why the automatic imaging processing is suspended upon detection of the trigger word as described above is as follows. It is considered that the user recognizes the state where the image capturing apparatus 101 is facing toward the subject that the user desires to image, and utters the trigger word at the timing when the user desires to image the subject. However, based on the detection of the trigger word, the first control unit 223 is unable to determine whether to perform imaging processing, since no command word instruction is detected. The first control unit 223 determines to perform imaging processing at the timing when the command word following the trigger word is recognized. In other words, if the first control unit 223 still continues the automatic imaging processing after the detection of the trigger word, the direction of the image capturing apparatus 101 upon recognition of the command word can be different from the direction in which the user desires to capture an image. To address this, the first control unit 223 suspends the automatic imaging processing in response to the detection of the trigger word, thereby maintaining the imaging direction in which the image capturing apparatus 101 faces at the timing when the user desires to capture an image. When the user then utters the command word for giving an imaging instruction after the trigger word, the first control unit 223 can perform imaging processing to capture an image of the subject that the user desires to image. In other words, the first control unit 223 can capture an image of the subject that the user desires to image, by suspending the driving processing.

In step S703, the first control unit 223 outputs, from the speaker, a detection sound for notifying the user of the detection of the trigger word.

In step S704, the first control unit 223 determines whether a command word is detected after the detection of the trigger word. If a command word is detected (YES in step S704), the processing proceeds to step S706. If no command word is detected (NO in step S704), the processing proceeds to step S705.

In step S705, the first control unit 223 determines whether a predetermined time has elapsed since the detection of the trigger word and the entry of the command word waiting state. If the predetermined time has elapsed (YES in step S705), the processing proceeds to step S701. In step S701, the first control unit 223 cancels the command word waiting state and enters a trigger word waiting state. At this time, the first control unit 223 resumes the automatic imaging processing. If the predetermined time has not elapsed (NO in step S705), the processing proceeds to step S704. The first control unit 223 repeats the processing of steps S704 and S705 until a command word is detected.

In step S706, the first control unit 223 determines whether the detected command word is a still image capturing command. The still image capturing command is a command for causing the image capturing apparatus 101 to perform imaging processing and recording processing for a single still image. If the detected command word is determined to be the still image capturing command (YES in step S706), the processing proceeds to step S707. If the detected command word is determined to be not the still image capturing command (NO in step S706), the processing proceeds to step S708.

In step S707, the first control unit 223 performs still image capturing processing. More specifically, the first control unit 223 causes the image processing unit 207 to convert the signal captured by the image capturing unit 206, based on the JPEG format, and causes the image recording unit 208 to record the image file on the recording medium 221.

In step S708, the first control unit 223 determines whether the detected command word is a subject change command. An example of the subject change command is a key phrase "take a picture of another person". If the detected command word is determined to be the subject change command (YES in step S708), the processing proceeds to step S709. If the detected command word is determined to be not the subject change command (NO in step S708), the processing proceeds to step S710.

In step S709, the first control unit 223 performs subject change processing. In the subject change processing, the first control unit 223 controls the driving of the lens barrel 102 to image a subject other than the subject currently being imaged. If no subject is detected at the time of detecting the command word, this step is skipped.

In step S710, the first control unit 223 determines whether the detected command word is a moving image recording start command. The moving image recording start command is a command for causing the image capturing apparatus 101 to perform imaging processing and recording processing for a moving image. If the detected command word is determined to be the moving image recording start command (YES in step S710), the processing proceeds to step S711. If the detected command word is determined to be not the moving image recording start command (NO in step S710), the processing proceeds to step S712.

In step S711, the first control unit 223 starts to capture a moving image by using the image capturing unit 206, and records the captured moving image data on the recording medium 221. During the recording of the moving image data, the first control unit 223 does not perform a subject search and maintains the suspension of the automatic imaging processing.

In step S712, the first control unit 223 determines whether the detected command word is a moving image recording end command. If the detected command word is determined to be the moving image recording end command (YES in step S712), the processing proceeds to step S713. If the detected command word is determined to be not the moving image recording end command (NO in step S712), the processing proceeds to step S714.

In step S713, the first control unit 223 stops the capturing of the image of the subject using the image capturing unit 206 and the recording of the moving image data on the recording medium 221, and finishes the recording of the moving image data.

In step S714, the first control unit 223 performs processing corresponding to any other command word. For example, the first control unit 223 performs processing corresponding to a command word for performing pan driving and tilt driving in the directions specified by the user, or processing corresponding to a command word for changing various imaging parameters, including an exposure correction parameter, of the image capturing apparatus 101.

In steps S715 and S716, the first control unit 223 performs processing for resuming the automatic imaging processing suspended in step S702. For example, the first control unit 223 performs the processing of the flowchart illustrated in FIG. 5, starting from the processing of step S502.

The above is the description of the voice recognition processing performed by the image capturing apparatus 101 according to the present exemplary embodiment.

As described above, in the voice recognition processing by the image capturing apparatus 101 according to the present exemplary embodiment, the image capturing apparatus 101 suspends the automatic imaging processing in response to the detection of the trigger word. More specifically, in the processing of step S702 in the flowchart illustrated in FIG. 7, the first control unit 223 suspends the automatic imaging processing in response to the detection of the trigger word, thereby maintaining the imaging direction in which the image capturing apparatus 101 faces at the timing when the user desires to capture an image. Accordingly, when the user utters the command word for giving an imaging instruction after the trigger word, the first control unit 223 performs the imaging processing with the angle of view that is the same as that at the time of receiving the trigger word. As a result, the image of the subject that the user desires to image can be captured.

In step S702, instead of suspending the automatic imaging processing, the first control unit 223 may perform control so that the driving speed of the imaging direction of the lens barrel 102 becomes lower than the driving speed immediately before the detection of the trigger word. In the present exemplary embodiment, considering the processing time for detecting a command word, the first control unit 223 performs control so that the driving speed of the imaging direction of the lens barrel 102 becomes lower than the driving speed of the imaging direction of the lens barrel 102 in the automatic imaging processing.

If the instruction of the command word is not an imaging instruction, the first control unit 223 then returns the driving speed to the original speed and continues the automatic imaging processing. This enables the image capturing apparatus 101 to both bring the imaging direction desired by the user into the angle of view more easily, and continue changing the angle of view in the automatic imaging processing.

If a subject is being detected at the timing when the trigger word is detected, then in step S702, the first control unit 223 may control the driving of the lens barrel 102 to track the subject, instead of suspending the driving processing. The reason is that it is considered that the subject being detected by the image capturing apparatus 101 at the timing when the user utters the trigger word is the subject that the user desires to image, and a user's desired image is more likely to be obtained by continuing the driving of the lens barrel 102 to track the subject. In this case, the first control unit 223 controls the driving of the lens barrel 102 to track the subject being captured at the timing when the trigger word is detected (to keep the subject within the angle of view). As described above, the first control unit 223 may capture the image of the subject that the user desires to image, by driving the imaging direction to track the subject being detected at the timing when the trigger word is detected. In a case where the subject is being tracked at the timing when the trigger word is detected, the first control unit 223 may similarly control, in step S702, the driving of the lens barrel 102 to track the subject instead of suspending the driving processing.

If no subject is being detected at the timing when the trigger word is detected, then in step S702, the first control unit 223 may control the driving of the lens barrel 102 to perform subject search processing. For example, the first control unit 223 performs subject search processing within a range that includes the current imaging direction and is narrower than the search range of the automatic imaging processing. As described above, the first control unit 223 may capture the image of the subject that the user desires to image, by searching the vicinity of the current imaging direction to find the subject in response to the detection of the trigger word.

As described above, the image capturing apparatus 101 not only suspends the automatic imaging processing in response to the detection of the trigger word, but also tracks the subject of which an image is being captured at the timing when the trigger word is detected, or otherwise limits the driving range in response to the detection of the trigger word.

This enables the image capturing apparatus 101 to capture an image of the subject that the user desires to image.

In step S702, the first control unit 223 may stop execution of the still image capturing processing or the moving image capturing processing. This reduces the load of the imaging processing, whereby the first control unit 223 can respond quickly to the instruction of the command word issued by the user following the trigger word.

If, in step S705, the predetermined time is determined to have elapsed, the first control unit 223 may output, from the audio output unit 218, a sound indicating the lapse of the predetermined time. This makes it easier for the user to know the timing to give the voice instruction again because the user can recognize that the image capturing apparatus 101 has failed to detect a command word.

If the first control unit 223 is performing the intermittent imaging processing as the automatic imaging processing, the first control unit 223 may postpone the execution of the sleep processing in response to the detection of the trigger word, until the completion of the processing instructed by the command word. In this case, the first control unit 223 executes the sleep processing in the intermittent imaging processing in response to the completion of the processing instructed by the command word.

An exemplary embodiment of the present disclosure can also be implemented by processing of supplying a program for implementing one or more functions according to the foregoing exemplary embodiment to a system or an apparatus via a network or a storage medium, and causing one or more processors in a computer of the system or the apparatus to read and execute the program. An exemplary embodiment of the present disclosure can also be implemented by a circuit for implementing one or more functions according to the foregoing exemplary embodiment (such as an application specific integrated circuit (ASIC)).

The present disclosure is not limited to the foregoing exemplary embodiments, and can be implemented by modifying the components without departing from the gist thereof. Moreover, various inventions can be formed by appropriately combining the plurality of components described in the foregoing exemplary embodiments. For example, some of all the components described in the exemplary embodiments may be omitted. The components according to the different exemplary embodiments may be combined as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-181149, filed Oct. 29, 2020, which is hereby incorporated by reference herein in its entirety.

What is claimed is:
1. An image capturing apparatus comprising:
one or more processors;
an image capturing unit configured to capture an image of a subject;
a driving unit configured to drive a driving member configured to change an imaging direction of the image capturing unit; and a detection unit configured to detect a first voice command for performing specific processing and a second voice command for starting the detection of the first voice command, wherein the driving unit limits the driving of the driving member in response to the detection of the second voice command by the detection unit, wherein, in a case where the driving unit limits the driving of the driving member, the driving unit drives the driving member at a speed lower than a driving speed of the driving member immediately before the detection of the second voice command by the detection unit, and wherein the image capturing unit, the driving unit, and the detection unit are implemented by the one or more processors.

2. The image capturing apparatus according to claim 1, wherein the image capturing unit captures the image of the subject in a case where the detection unit detects the first voice command for performing imaging processing while the driving unit is limiting the driving of the driving member.

3. The image capturing apparatus according to claim 1, further comprising:

a determination unit configured to automatically determine an imaging target; and a control unit configured to control automatic imaging processing, wherein the automatic imaging processing is processing for causing the driving unit to drive the driving member so that the image capturing unit captures an image of the imaging target determined by the determination unit, wherein the determination unit and the control unit are implemented by the one or more processors.

4. The image capturing apparatus according to claim 3, wherein the determination unit calculates an importance level of each detected subject based on information about a face of the detected subject, and determines the imaging target based on the importance level.

5. The image capturing apparatus according to claim 3, wherein the detection unit detects the first voice command and the second voice command during execution of the automatic imaging processing.

6. The image capturing apparatus according to claim 3, wherein the automatic imaging processing is suspended in a case where the detection unit detects the second voice command during execution of the automatic imaging processing.

7. The image capturing apparatus according to claim 3, wherein the driving unit limits the driving of the driving member in a case where the detection unit detects the second voice command during execution of the automatic imaging processing.

8. The image capturing apparatus according to claim 3, wherein the driving unit drives the driving member in the automatic imaging processing, with entire surroundings of the image capturing apparatus as a driving range.

9. The image capturing apparatus according to claim 3, wherein in a case where the driving unit limits the driving of the driving member, the driving unit drives the driving member within a driving range narrower than a driving range in the automatic imaging processing.

10. The image capturing apparatus according to claim 1, wherein in a case where the driving unit limits the driving of the driving member, the driving unit drives the driving member so that a subject of which an image is being captured when the second voice command is detected falls within an angle of view.

11. The image capturing apparatus according to claim 1, wherein in a case where the driving unit limits the driving of the driving member, the driving unit drives the driving member to search for a subject during limiting the driving of the driving member.

12. The image capturing apparatus according to claim 1, wherein in a case where the driving unit limits the driving of the driving member, the driving unit stops the driving of the driving member.

13. The image capturing apparatus according to claim 1, further comprising a microphone, wherein the detection unit detects the first and second voice commands by analyzing an audio signal input from the microphone.

14. A control method for an image capturing apparatus, the control method comprising:

capturing an image of a subject;

driving a driving member configured to change an imaging direction in the capturing;

detecting a first voice command for performing specific processing and a second voice command for starting the detection of the first voice command; and limiting the driving of the driving member in response to the detection of the second voice command, wherein, in a case where the driving of the driving member is limited, the driving member is driven at a speed lower than a driving speed of the driving member immediately before the detection of the second voice command.

15. A non-transitory computer-readable recording medium recording a program for causing an image capturing apparatus to perform a control method comprising:

capturing an image of a subject;

driving a driving member configured to change an imaging direction in the capturing;

detecting a first voice command for performing specific processing and a second voice command for starting the detection of the first voice command; and limiting the driving of the driving member in response to the detection of the second voice command, wherein, in a case where limiting the driving of the driving member, the driving member is driven at a speed lower than a driving speed of the driving member immediately before the detection of the second voice command.

* * * * *